(12) United States Patent
Hasegawa

(10) Patent No.: US 6,230,853 B1
(45) Date of Patent: May 15, 2001

(54) DRUM BRAKE DEVICE

(75) Inventor: Junichi Hasegawa, Kasugai (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/273,568

(22) Filed: Mar. 22, 1999

(30) Foreign Application Priority Data

Mar. 23, 1998 (JP) .................................................. 10-094032

(51) Int. Cl.⁷ ............................ F16D 51/02; F16D 51/24; F16D 65/09; F16D 65/56; F16D 5/14
(52) U.S. Cl. .................. 188/78; 188/79.51; 188/196 BA
(58) Field of Search ...................................... 188/79.51, 78, 188/106 F, 216, 196 BA, 196 M, 196 V, 340, 330–336, 79.52–79.66, 250 R, 250 B

(56) References Cited

U.S. PATENT DOCUMENTS 5,819,887 * 10/1998 Asai et al. .............................. 188/78

FOREIGN PATENT DOCUMENTS

| | | |
|---|---|---|
| 9112597 | * 5/1997 | (JP) . |
| 9166162 | * 6/1997 | (JP) . |
| 9166163 | * 6/1997 | (JP) . |
| 11351288 | * 12/1999 | (JP) . |

* cited by examiner

Primary Examiner—Douglas C. Butler
(74) Attorney, Agent, or Firm—Arent Fox Kintner Plotkin & Kahn, PLLC

(57) ABSTRACT

A single shoe drum brake device which provides stable braking effect by tending to equalize the braking effect when the vehicle is moving forward and backward without losing self-servo property during moving either forward or backward. Additionally, the device avoids damage to the brake pipe due to objects such as flying gravel, debris, and the like by locating the wheel cylinder in upper portion of the brake device. Further, the structure enables the run of the parking brake cable to be directed entirely toward the front of the vehicle. One of two anchors (10, 14) is positioned so that the distance from a horizontal straight line through the brake center (0) and across the brake shoe (3) to that anchor is shorter than the distance from the line to the other anchor. This one anchor is a pivot shoe anchor and the other anchor is a floating shoe anchor.

20 Claims, 11 Drawing Sheets

DRUM BRAKE DEVICE

BACKGROUND OF INVENTION

This invention relates to a drum brake device for a rear wheel, which comprises a single brake shoe which functions as a leading shoe with self-servo property either when the vehicle is moving forward or when it is moving backward.

Japanese Patent Application Publication No. Heisei 9-324829, illustrates a drum brake device which comprises a single brake shoe with a self-servo property when a vehicle is moving either forward or backward.

An example of this type of drum brake device is explained with reference to FIG. 12. In FIG. 12, a single brake shoe a is movably mounted on the back plate. An upper portion of the brake shoe a engages with the anchor b. A lower portion engages with a shoe clearance adjustment device c. A link d is rotatably pivoted at the central region of the brake shoe a. The upper portion of the link d functionally engages with the anchor b. The lower portion of the link d abuts against a service brake actuator e operating when the service brake is activated. The upper portion of the brake shoe a is supported by the anchor b when the brake drum rotates in one direction (the direction shown by the arrow A). The lower portion of the brake shoe a is supported by the shoe clearance adjustment device c when the brake drum rotates in the reverse direction (opposite to the arrow A).

There are two points which need to be considered when designing a drum brake device. First, a brake fluid pipe to be connected to a wheel cylinder is desirably kept a greater distance from the road surface in order to avoid damaging the pipe because of flying gravel, debris and the like.

Secondly, if the rear wheels of the vehicle lock before the front wheels, handling becomes more difficult, and the driver could be in danger. Therefore, it is important to avoid such a situation.

In addition, as shown in the conventional art, if the shoe functions as a floating shoe when the brake drum rotates in any direction, it is well-known that the braking effect can be increased as the distance from a horizontal straight line X across the center of the brake to the supporting point of the brake shoe becomes shorter. If the dimensions or size relative to the braking effect is same, it is well-known that the braking effect of a pivot shoe rather than a floating shoe is lower if the drum brake is designed as an ordinary type. The detail is described in "BRAKE DESIGN AND SAFETY" by Rudolf Limpert, SAE International, pages 61–75, and "Tire, Brake" of "Automobile Engineering Encyclopedia", Sankaido.

From the above-described view, the wheel cylinder of the drum brake device of FIG. 12 may be located at the upper portion of the device when applied to the right wheel side of the vehicle, thereby securing the braking effect of the vehicle moving backward and arranging the run of a parking brake cable to be directed toward the front of the vehicle. However, the available space for arranging the shoe clearance adjustment device supporting the brake shoe when moving forward becomes limited, thereby making it difficult to design a device to eliminate the problem of the rear wheels being locked first.

OBJECT OF INVENTION

This invention was made to resolve the problems above. More specifically, an object of the invention is to provide a drum brake device which realizes a stable braking effect by tending to equalize the braking effects of both moving forward and backward without losing self-servo property.

Another object of this invention is to provide a drum brake device which avoids positioning liable to damaging the brake fluid pipe due to flying gravel, debris, and the like and enables the pull of a parking brake cable to be pulled directly toward the front of the vehicle.

More specifically, it is an object of the invention to provide a drum brake device comprising, a back plate, first and second anchor members mounted on the back plate, a single brake shoe movably mounted on the back plate, one end of the brake shoe being functionally engaged with the first anchor member through abutment against the first anchor member and the other end of the brake shoe being functionally engaged with the second anchor member through abutment against the second anchor member, a service brake actuator, which activates when a service brake is applied, mounted on the back plate, a supporting member mounted on the back plate, a link pivotably supported at the pivot point of the central region of the brake shoe, one end of the link being functionally engaged with the service brake actuator, the other end of the link being supported by the supporting member, wherein the operation force of the service brake actuator which acts on the link is transferred to the brake shoe through the pivot component of the link, one of the first or second anchor member functioning as a pivot anchor when the distance from a horizontal straight line through the center of the brake and across the brake shoe to one of the first or second anchor member is shorter than the distance from the horizontal straight line to the other anchor member, and the other anchor member functions as a floating one.

This invention is a drum brake as above, wherein a shoe clearance adjustment means for adjusting a clearance between the brake drum and the brake shoe, is provided at either the first or the second anchor member.

This invention further is a drum brake device as above, wherein the shoe clearance adjustment means automatically senses the amount of opening by which the brake shoe opens and adjusts the clearance between the brake drum and the brake shoe.

This invention still further is a drum brake device as above, which further comprises a parking brake actuator, which operates when a parking brake is activated. The parking brake actuator is provided so as to open one side of the link.

This invention still further is a drum brake device as above, which further comprises a shoe return spring, wherein the moment of the shoe return spring which pivots at the pivot point of the link engaging with the brake shoe is set so that the moment at the anchor member side is larger than the moment at the other side when a vehicle is moving forward.

This invention still further is a drum brake device as above, wherein the supporting member supporting the other side of the link is shared with the anchor member supporting the brake shoe.

BRIEF DESCRIPTION OF THE DRAWINGS

The above and other object and the attendant advantages of the present invention will become readily apparent by reference to the following detailed description when considered in conjunction with the accompanying drawings wherein.

DETAILED DESCRIPTION OF PREFERRED EMBODIMENTS

A first embodiment of this invention is described below with reference to FIGS. 1–6. This embodiment relates to a drum brake device provided at the right wheel side of a vehicle.

Figure 1:
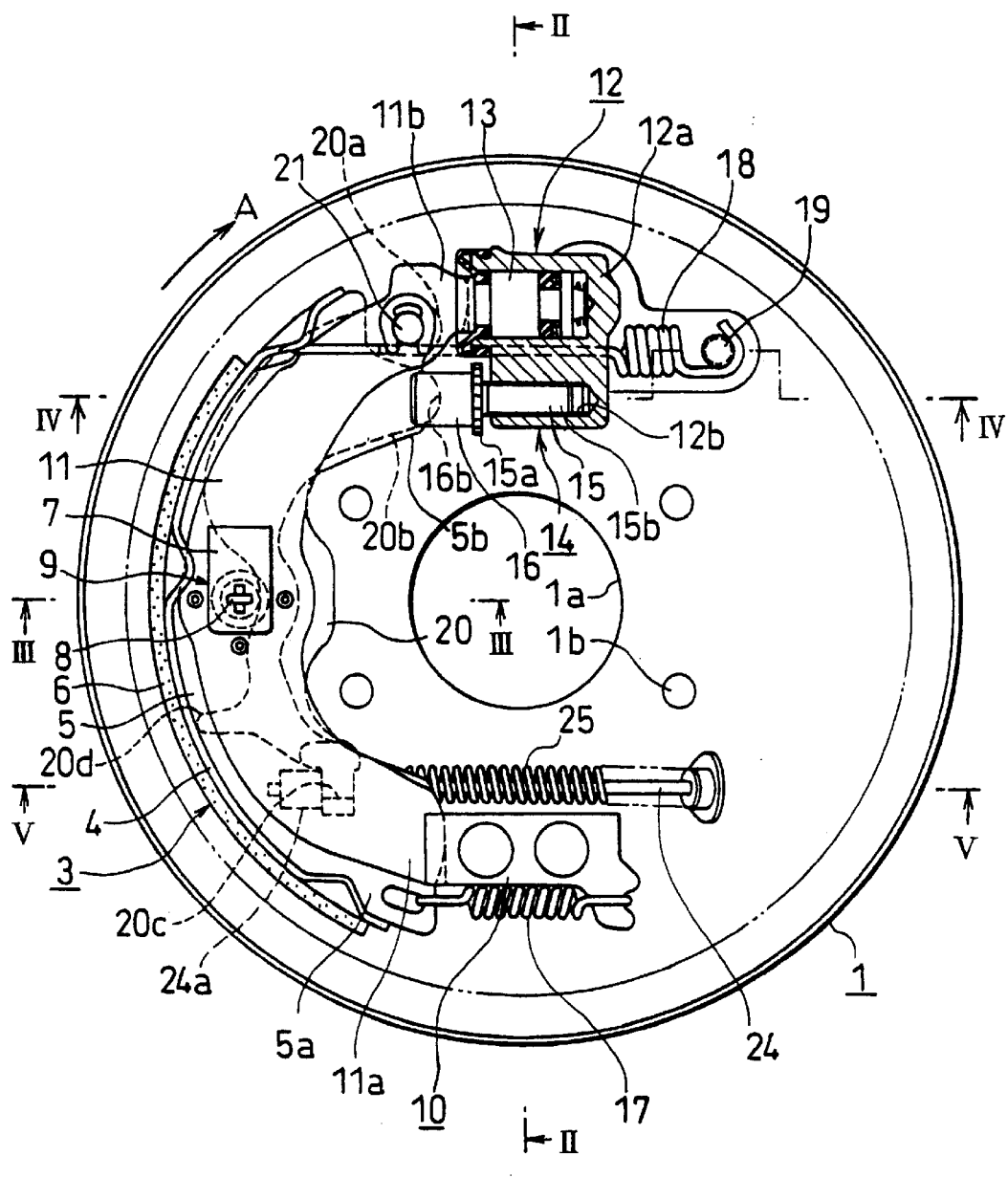
FIG. 1 is a plan view of a first embodiment of the drum brake device of this invention.
Figure 2:
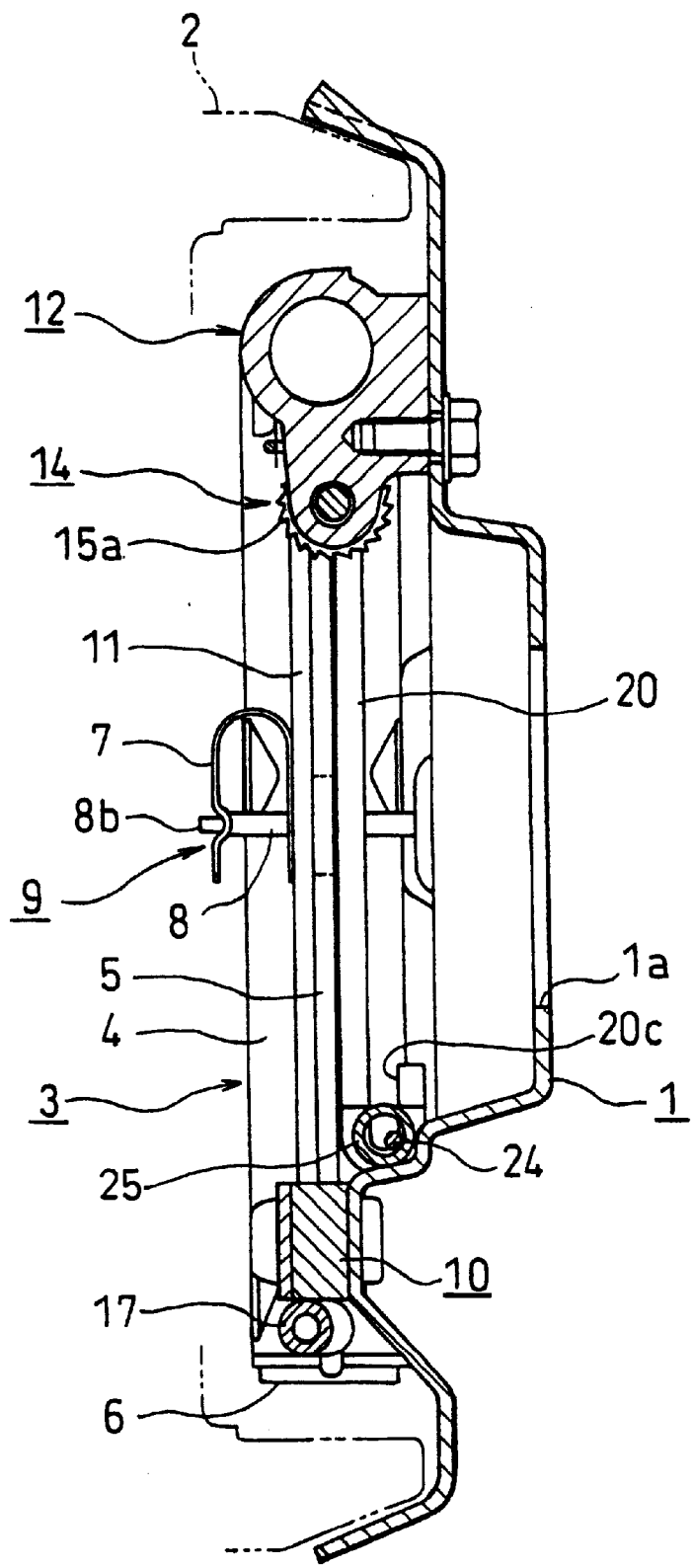
FIG. 2 is a cross-section view of FIG. 1 taken along the line II—II.
Figure 3:
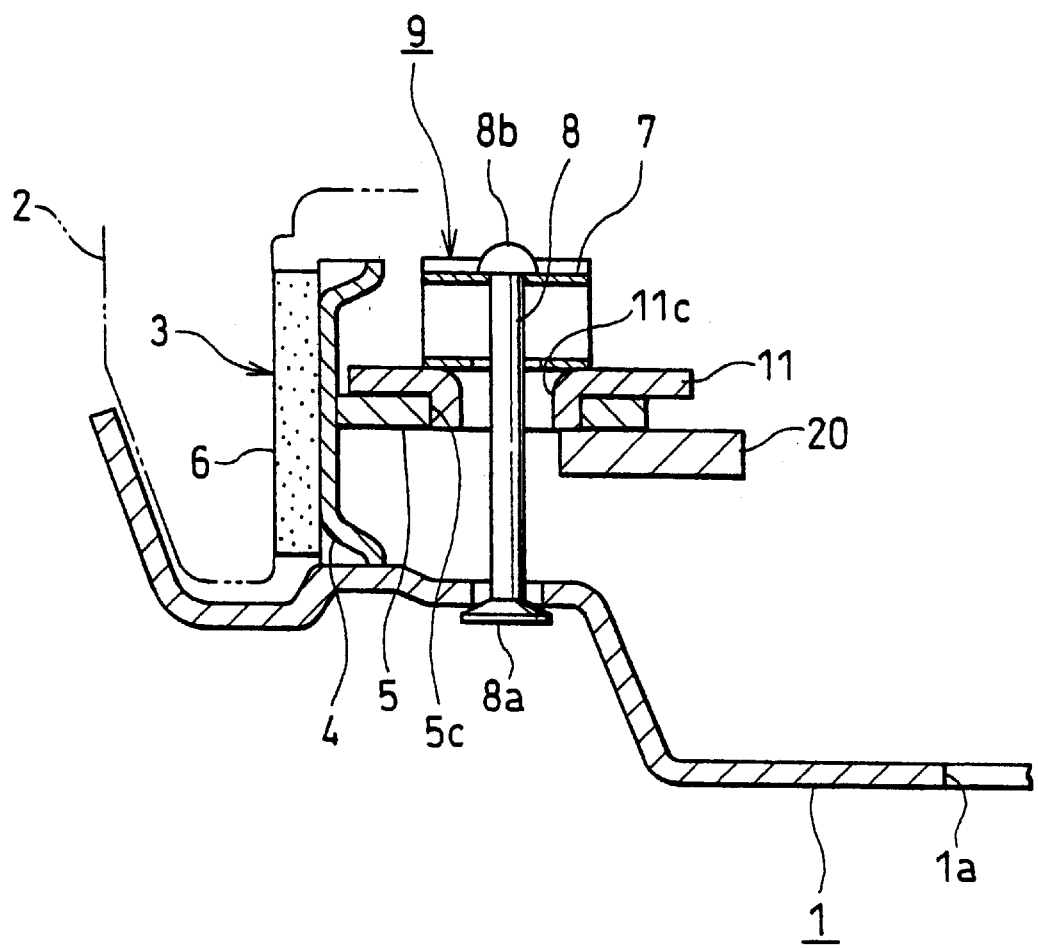
FIG. 3 is a cross-section view of FIG. 1 taken along the line III—III.

As shown in FIGS. 1 and 2, central hole 1a of the back plate 1 is provided to be freely positioned over the axle and is affixed to the stationary part of the vehicle by four bolts, not shown in the diagram, inserted through bolt holes 1b. Brake drum 2 faces the back plate 1 and rotates together with a wheel. The brake drum 2 is shown by a two-point chain line as shown in FIGS. 2 and 3.

A single brake shoe 3 is configured from a shoe rim 4, a shoe web 5 joined to the shoe rim 4 to form a "T" in cross section, and a lining 6 affixed around the outer-surface of the shoe rim 4 and frictionally engaging with the brake drum 2 to produce the braking action.

The brake shoe 3 is mounted on top of the back plate 1 by an already-known shoe-hold mechanism 9 which includes the plate spring 7 and a shoe-hold pin 8. The lower end, i.e., the other end 5a, of the shoe web 5 slidably contacts with and abuts against the flat surface of an anchor 10 functioning as the first anchor member, while the upper end, i.e., one end 5b, not slidably abuts against a shoe clearance adjustment device 14 also serving as the second anchor member. This shoe clearance adjustment device 14 has a capacity to adjust the clearance between the brake drum 2 and the brake shoe 3 as described later.

A link 11 is superimposed on the surface of the shoe web 5 and has a lower end 11a which abuts against the first anchor member 10.

The first anchor member 10 of this embodiment functions as a supporting member for the brake shoe 3 and the link 11; however, a supporting member for the brake shoe 3 and a supporting member for the link 11 may be provided separately. The upper end 11b of the link 11 engages with a piston 13 of the one-side-open-type wheel cylinder 12 which functions as a service brake actuator activated when the service brake is operated.

The link 11 is rotatably pivoted on the shoe web 5 via the shoe-hold mechanism 9 comprising the plate spring 7 and the shoe-hold pin 8. FIG. 3 shows the pivot mechanism for the link 11. A hollow protuberance 11c, formed as a burr with a press, is integrally formed in the central region of the link 11. The hollow protuberance 11c is pivoted in the hole 5c bored in the shoe web 5.

A head segment 8a of the shoe-hold pin 8 engages the hole of the back plate 1, while a latch segment 8b of the shoe-hold pin 8 penetrates freely through the hollow protuberance 11c of the link 11 and engages the plate spring 7 mounted on top of the link 11. The elastic force of the plate spring 7 elastically secures the link 11 to the shoe web 5.

The shoe clearance adjustment device 14, as shown in FIG. 1, supports the upper end 5b of the shoe web 5 and adjusts the clearance between the brake drum 2 and the lining 6. The shoe clearance adjustment device 14 comprises an adjustment bolt 15 screwed into a cavity in the cylinder body 12a of the wheel cylinder 12 and a sleeve 16.

Figure 4:
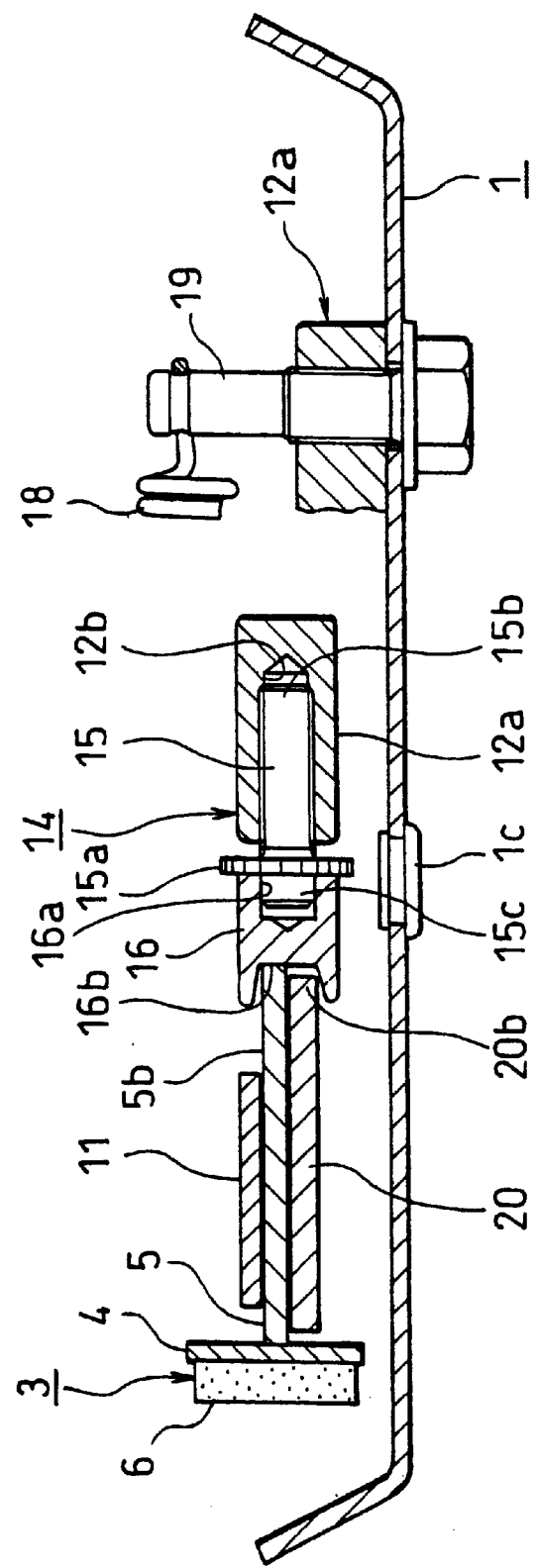
FIG. 4 is a cross-section view of FIG. 1 taking along the line IV—IV.

The shoe clearance adjustment device 14 is illustrated in detail in FIG. 4. A female thread 12b is formed inside a cavity molded in parallel to the piston 13 inside the cylinder body 12a. A screw stem 15b on one end of the adjustment bolt 15 is screwed into the female thread 12b, while the other stem end 15c of the adjustment bolt is inserted so as to rotate inside a blind hole 16a of the sleeve 16. A toothed adjustment wheel 15a is set in the central region of the adjustment bolt 15.

A convex-shaped notched groove 16b, as in this embodiment shown in dotted line in FIG. 1, or concave-shaped bottom surface is provided at the end of the sleeve 16. The upper end 5b of the shoe web 5 contacts the bottom surface of the notched groove 16b leaving a slight clearance between a brake lever 20 (described below) and the bottom surface of the notched groove 16b.

It is apparent from the description above of the brake shoe supporting system using the anchor 10 and the shoe clearance adjustment device 14 as the first and second anchor members that the brake shoe 3 functions as a floating shoe when the brake shoe 3 is supported at the first anchor member 10 side at the brake in operation since the brake shoe 3 stays along the sliding surface of the brake drum 2. When the brake shoe 3 is supported on the second anchor member 14 side, the brake shoe 3 functions as a pivot shoe since the brake shoe 3 opens with the pivot point at the center of the bottom surface of the notched groove 16b 16a in the second anchor member 14.

As shown in FIG. 1, a first shoe return spring 17 is stretched between the lower end 5a of the shoe web 5 and a certain portion of the anchor 10. A second shoe return spring 18 is stretched between the upper end 5b of the shoe web 5 and the bolt 19 which bolts the wheel cylinder 12 on the back plate 1.

Figure 6:
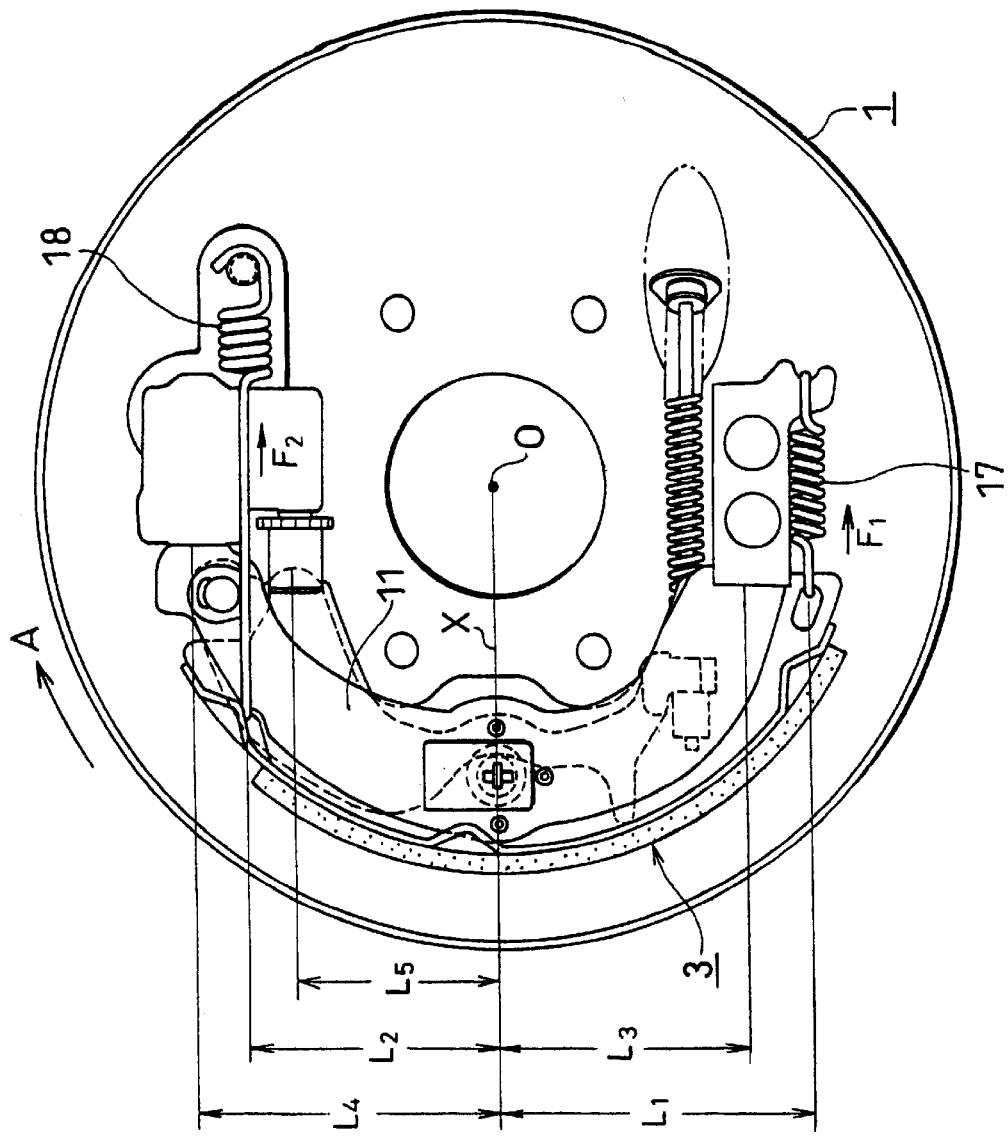
FIG. 6 is a model view illustrating the moment operating on the brake shoe.

The first and the second shoe return springs 17, 18 are set so as to satisfy the following relational formula for the torque acting on brake shoe 3 when the brake drum rotates in the direction marked by the arrow A in FIG. 6 when the brake drum 2 is advancing forward:

$$F1 \times L1 < F2 \times L2$$

F1=Mounted load of the lower first shoe return spring 17

F2=Mounted load of the upper second shoe return spring 18

L1=Distance between the pivot point of the brake shoe 3 with the link 11 and the lower first shoe return spring 17

L2=Distance between the pivot point of the brake shoe 3 with the link 11 and the upper second return spring 18

That is, the first and second shoe return springs 17, 18 are set such that, with the fulcrum being the pivot point with the link 11, the moment acting on the brake shoe 3 will be greater on the rotation-exit side of the brake shoe than on the rotation-entry side. This is to prevent imposing an impact load between the brake shoe and the anchor member by preventing the separation of the rotation-exit side of the brake shoe from the anchor member relative to the rotational direction A of the brake drum when in moving forward which is the overwhelmingly more frequent action. Further, even when the brake lever 20 is adjusted to rather be pulled, thereby creating a slight opening of the brake shoe 3, the rotation-exit side of the brake shoe 3 does not separate from the second anchor member 14, and the same effect as above may be expected.

Next the parking brake, which is the parking brake actuator, is explained. As shown in FIG. 1, a brake lever 20 is set on the reverse side of the shoe web 5. A base end 20a of the brake lever 20 is pivotably supported by a pin 21. A central segment 20b adjacent to the base end 20a is engaged with the notched groove 16b of the sleeve 16 with a slight gap as shown in FIG. 4. A U-shaped groove 20c is bent in the free end of the brake lever 20. A stopper 20d adjacent to the U-shaped groove 20c abuts against the inner face of the shoe rim 4 and regulates the return position of the lever 20.

Figure 5:
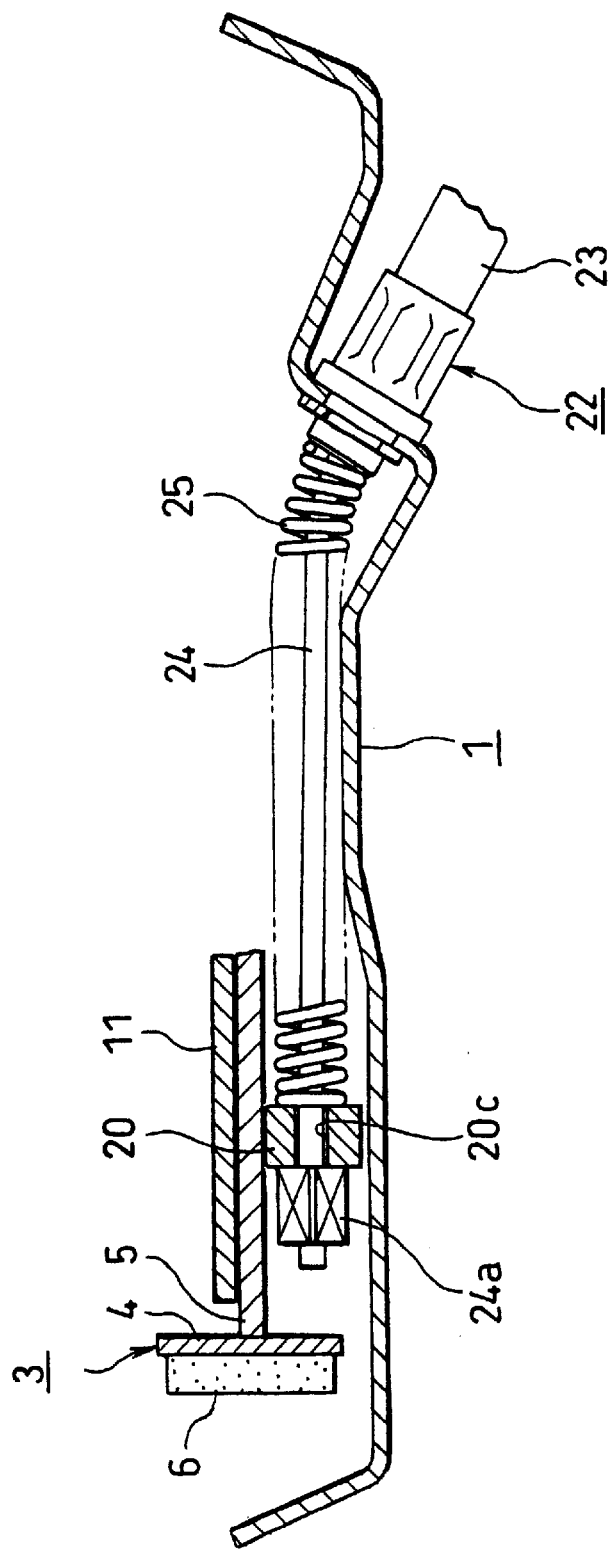
FIG. 5 is a cross-section view of FIG. 1 taken along the line V—V.

FIG. 5 shows the connection of a remote control parking brake cable 22, wherein one end of an outer casing 23 is attached to the back plate 1, and a nipple end 24a affixed to one end of an inner parking brake cable 24 is latched in the U-shaped groove 20c of brake lever 20. A coil spring 25, enclosing the inner parking brake cable 24, is compressed between the outer casing 23 and the U-shaped groove 20c, and serves to provide the force between the brake lever 20 and the inner parking brake cable 24.

During service brake operation, for instance, when the driver presses the brake pedal, the wheel cylinder 12 is pressurized, whereupon the piston 13 presses against upper end 11b of the link 11. The link 11 turns with the point of abutment with the first anchor member 10 on the lower end 11a side as the fulcrum and the hollow protuberance 11c acts on the shoe web 5 to move the brake shoe 3.

At this point, a moment differential arising from the first and second shoe return springs 17, 18 is acting on the brake shoe 3, whereupon the upper end 5b of the shoe web 5 opens, with the point of abutment against the second anchor member 14 on the lower end 5a side as the fulcrum, forcing the lining 6 against the rotating brake drum 2, and the friction so created will brake the vehicle.

Thus, it is clear from the above that the force acting on the brake shoe can be easily changed by the lever ratio of the link 11 (see FIG. 6). The lever ratio is defined as:

(L3+L4)/L3

L3=Distance between the pivot point of the link 11 and the point of support on the lower end 11a side L4=Distance between the pivot point of the link 11 and the point of action.

If the brake drum 2 is rotating in the direction A as shown in FIG. 1, the upper end 5b of the shoe web 5 is supported by the second anchor member, (the shoe clearance adjustment device 14), and acts as a pivot shoe with a self-servo property. Accordingly, the upper end 5b of the shoe web 5 constantly abuts against the second anchor member 14, thus preventing the pivot-exit side of the brake shoe 3 relative to the direction of rotation of the brake drum 2 from separating from the second anchor member 14. Therefore, no impact load between them is created, which may increase the durability of the device, and no impact noise is caused.

If the brake drum 2 is rotating in the reverse direction, the lower end 5a of the shoe web 5 is supported by the first anchor member 10 and acts as a floating shoe with a self-servo property.

As shown in FIG. 6, in consideration of designing, a layout for connecting the brake fluid pipe to the brake device, the distance (L5) from the horizontal straight line X through the center of the brake and across the brake shoe 3 to the second anchor member (the shoe clearance adjustment device 14), is set to be much shorter than the distance (L3) from the horizontal straight line X through the center of the brake and across the brake shoe 3 to the first anchor member (the anchor 10).

In this invention, the second anchor member (shoe clearance adjustment device 14) closer to the brake center is a pivot type anchor, while the first anchor member (anchor 10) further to the brake center is a floating type anchor. This tends to equalize the braking effects when the vehicle is either moving forward or backward. This also prevents the braking effect from over-effectuating when the vehicle is moving forward and secures the braking effect when the vehicle is moving backward.

In addition, this invention is expected to have the same effect as a widely known leading-trailing type drum brake device, e.g., Japanese Patent Official Gazette No. Heisei 1-58374, where a pair of brake shoes are provided to face each other.

This invention tends to equalize the braking effects when moving forward and backward by differentiating the upper and lower anchor types. In addition, damage to the brake fluid pipe due to flying gravel, debris, and the like is prevented by locating the wheel cylinder 12 at the upper side of the brake device. This also facilitates the arrangement of the parking brake cable 22 because arranging the parking brake cable 22 to run entirely in the direction of the vehicle front is possible.

In addition, since the brake shoe 3 is a single shoe, the pedal stroke when the service brake is applied or the parking lever stroke when the parking brake is applied, may be reduced to roughly half in comparison with the conventional device, thereby providing more comfortable feeling to the driver. Furthermore, because of the single brake shoe 3, a large space is saved at the right side of the back plate 1 in FIG. 1. Other devices, such as sensors for anti-lock braking system, may be easily installed.

When adjusting the clearance between the lining 6 and the brake drum 2, the plug 1c as shown in FIG. 4 is removed, and a tool, such as a screwdriver, may be inserted from the outside of the brake device to rotate the toothed adjustment wheel 15a to screw the adjustment bolt 15 in or out.

During parking brake operation, for instance, by operating the parking lever inside the vehicle compartment, the inner parking brake cable 24 is pulled. The brake lever 20 rotates counterclockwise in FIG. 1 with the point of abutment with the sleeve 16 of the central segment 20b as the fulcrum. Then, the brake lever 20 is pressed toward the upper end 11b of the link 11 via the pin 21.

Accordingly, as in the service brake operation, the lower end 5a of the brake shoe 3 opens at the pivot point of the upper end 5b side, and the lining 6 frictionally engages with the brake drum.

The second embodiment of the drum brake device is equipped with an automatic shoe clearance adjustment function and is explained next, with reference to FIGS. 7–9. Those components which are the same as in the first embodiment are identified by a 100-series number and an explanation thereof is omitted here.

These include the back plate 101, the brake shoe 103, the shoe web 105, the lining 106, the anchor (first anchor member) 110, the link 111, the wheel cylinder (service brake actuator) 112, the first shoe return spring 117, the second shoe return spring 118, and the brake lever (parking brake actuator) 120.

The shoe clearance adjustment device 114, which also functions as the second anchor member, of this embodiment includes an adjustment bolt 115 and a toothed nut 127. The adjustment bolt 115 has a screw stem 15b on one end which is screwed into a blind hole 12c formed in the cylinder body 112a and a notched groove 115d formed at a flattened portion 115c on the other end which supports the shoe web 105, the link 111, and the brake lever 120.

Figure 7:
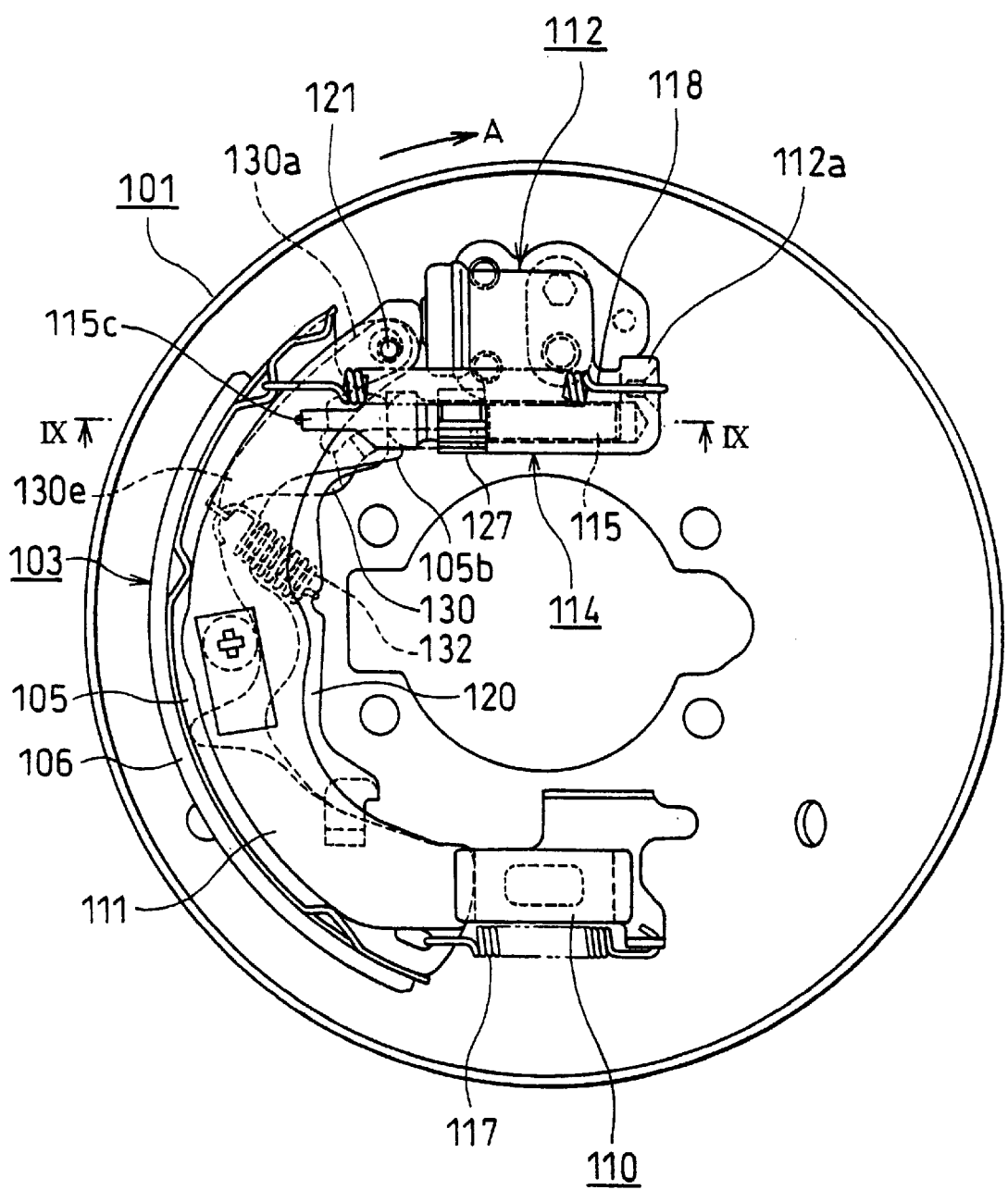
FIG. 7 is a plan view of a second embodiment of this invention.
Figure 8:
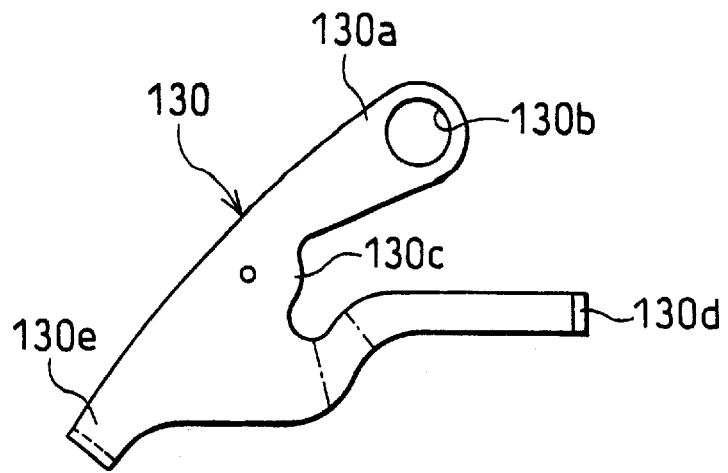
FIG. 8 is a plan view of the adjust lever.

The bottom surface of the notched groove 115d in this embodiment has a convex circular bottom surface as shown in dotted line in FIG. 7. The upper end 105b of the shoe web 105 is designed to face and to contact with that bottom surface. The brake shoe 103 functions as a pivot shoe when the brake drum rotates in the direction of arrow A as the above-described first embodiment.

In addition, the toothed nut 127 is screwed around the screw stem 115b of the adjustment bolt 115, whereby the return position of the brake shoe 103 is restricted by the right side surface of the toothed nut 127 abutting against the opening end surface of the blind hole 112c of the cylinder body 112a. Saw-like teeth 127a are integrally formed at the outer surface of the toothed nut 127.

The upper second shoe return spring 118 extends between the cylinder body 112a and the brake shoe 103.

Action during braking and the action of the manual shoe clearance adjustment is the same as that for the first embodiment, and an explanation thereof is omitted here.

In this second embodiment, the shoe clearance adjustment device 114 is an automatic shoe clearance adjustment device. An adjustment lever 130 is shown in FIG. 8 and is a Y-shaped like part provided at the back plate 101 side of the brake lever 120. A hole 130b at the end of one arm 130a is pivotably supported at the pin 121 supporting the brake lever 120 at the link 111.

Figure 9:
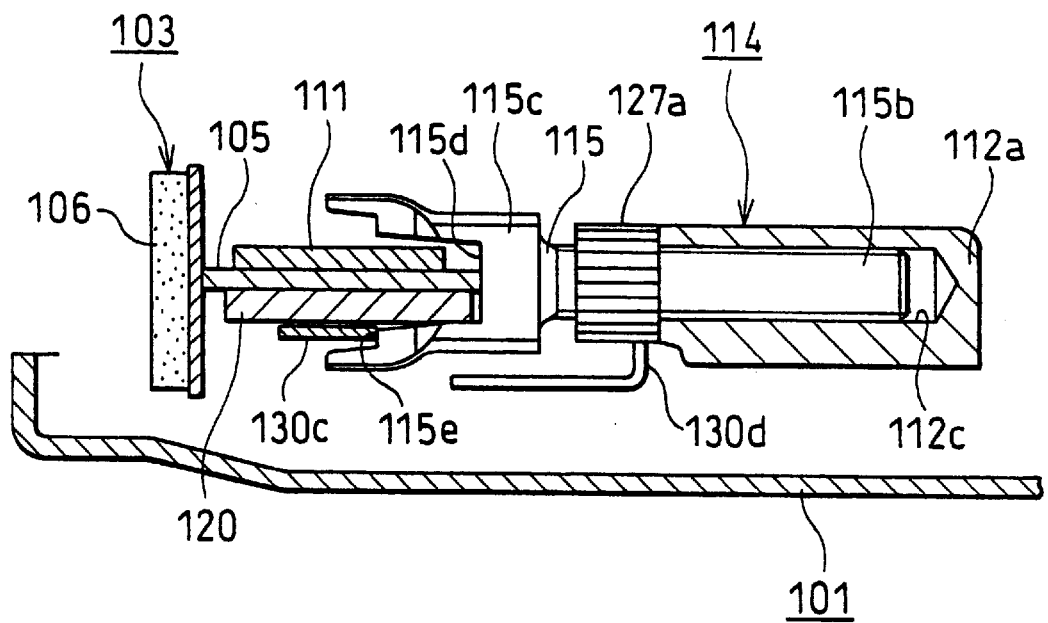
FIG. 9 is a cross-section view of FIG. 7 taken along the line IX—IX.

A central portion 130c of the adjustment lever 130 engages with a stepped surface 115e of the notched groove 115d of the adjustment bolt 115 as shown in FIG. 9. The other arm 130d engages with the saw like teeth 127a of the toothed nut 127.

An adjustment spring 132 extends between the another arm 130e of the adjustment lever 130 and the brake lever 120. FIG. 7 illustrates when the counterclockwise spring force (with the pin 121 as the fulcrum) is applied to adjustment lever 130.

When the service brake is operated to open the anchor (link 111 with the first anchor member 110) as the fulcrum, the pin 121 moves together with the link 111. At this time, the energizing force of the adjustment spring 132 presses the central portion 130c of the adjustment lever 130 against the stepped surface 115e of the notched groove 115d of the adjustment bolt 115, causing the other arm 130d to rotate in the counterclockwise direction as shown in FIG. 7.

If the lining 106 wears out, the degree of opening of the link 111 thereby increases. Then, when the degree of rotation of the other arm 130d of the adjustment lever 130 exceeds the pitch of the saw-like teeth 127a, the adjustment bolt 115 is automatically adjusted by being screwed out of the toothed nut 127 in an amount sufficient to keep a constant clearance between the brake drum and the lining 106.

When the parking brake is applied, the operation force of the brake lever 120 increases the thrusting force against the shoe clearance adjustment device 114, but the adjustment spring 132 is not energized sufficiently to overcome that force, hence no clearance adjustment is made.

Figure 10:
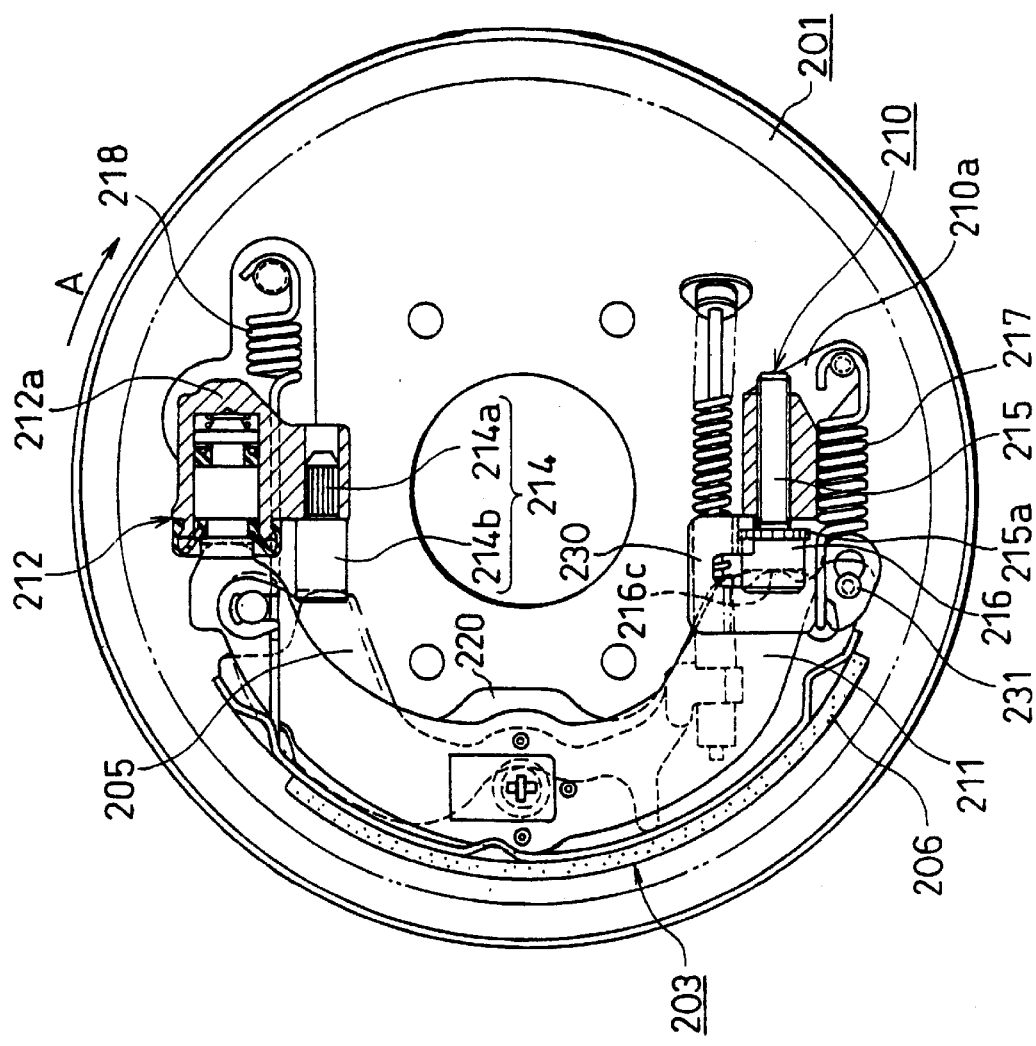
FIG. 10 is a plan view of a third embodiment of this invention.

The third embodiment of the drum brake device is explained next, with reference to FIGS. 10–11. Those components which are the same as in the first embodiment are identified by a 200-series number and an explanation thereof is omitted here.

A difference between the third embodiment and the above-described first and second embodiments is that a shoe clearance adjustment mechanism, which adjusts the clearance between the brake drum and the brake shoe 203, i.e., the automatic shoe clearance adjustment device to automatically adjust the clearance, is provided at the anchor (lower first anchor member 210).

In this embodiment, the upper second anchor member 214 has a stepped-pin device wherein a small diameter axle portion 214a is inserted and press-fitted into a cavity formed in the cylinder body 212a of the wheel cylinder 212 to support the shoe web 205 with a bottom surface of a concave notched groove formed in a larger diameter axle portion 214b.

Figure 11:
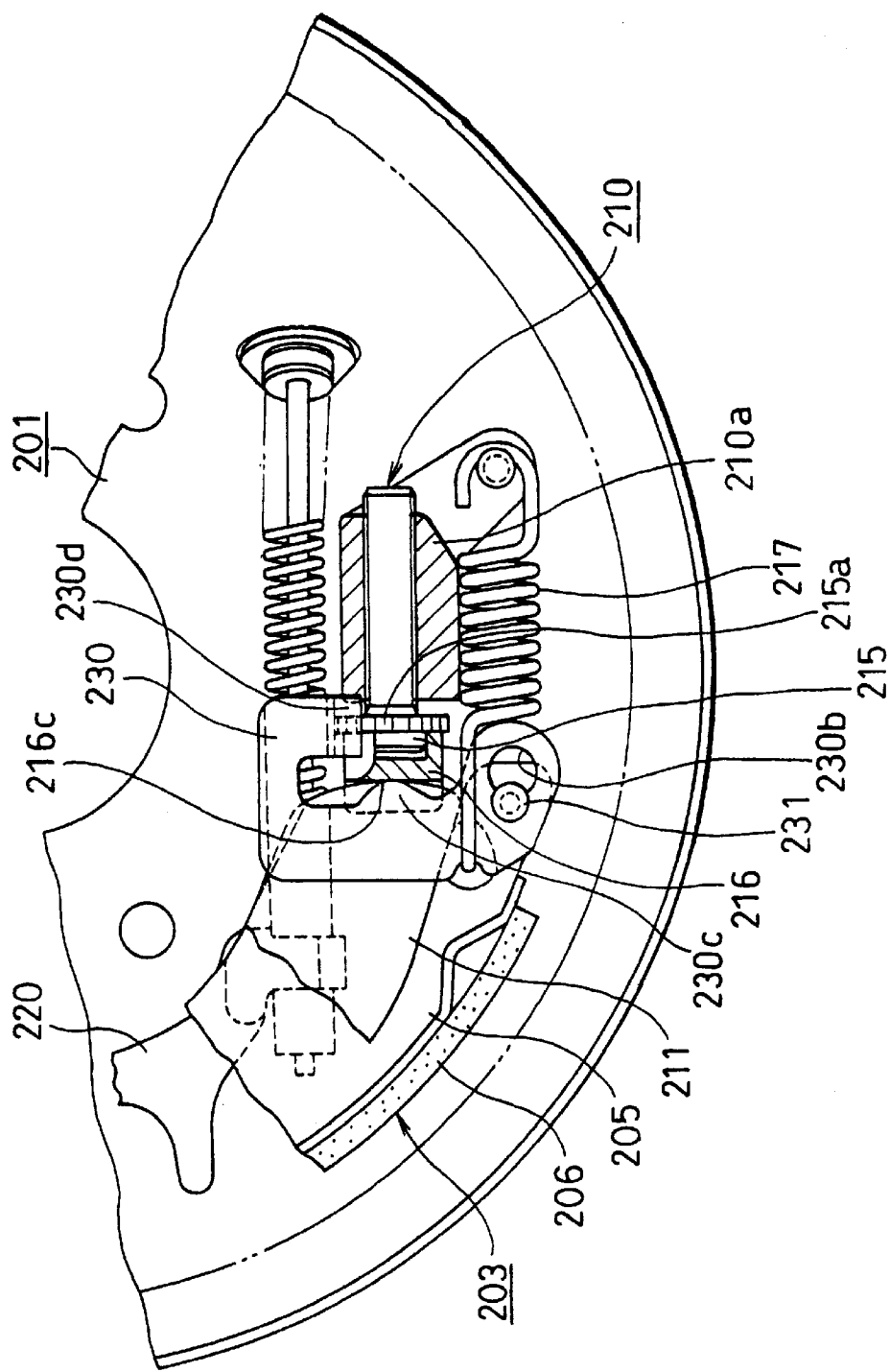
FIG. 11 is an enlarged plan view of the lower portion of the drum brake device shown in FIG. 10.
Figure 12:
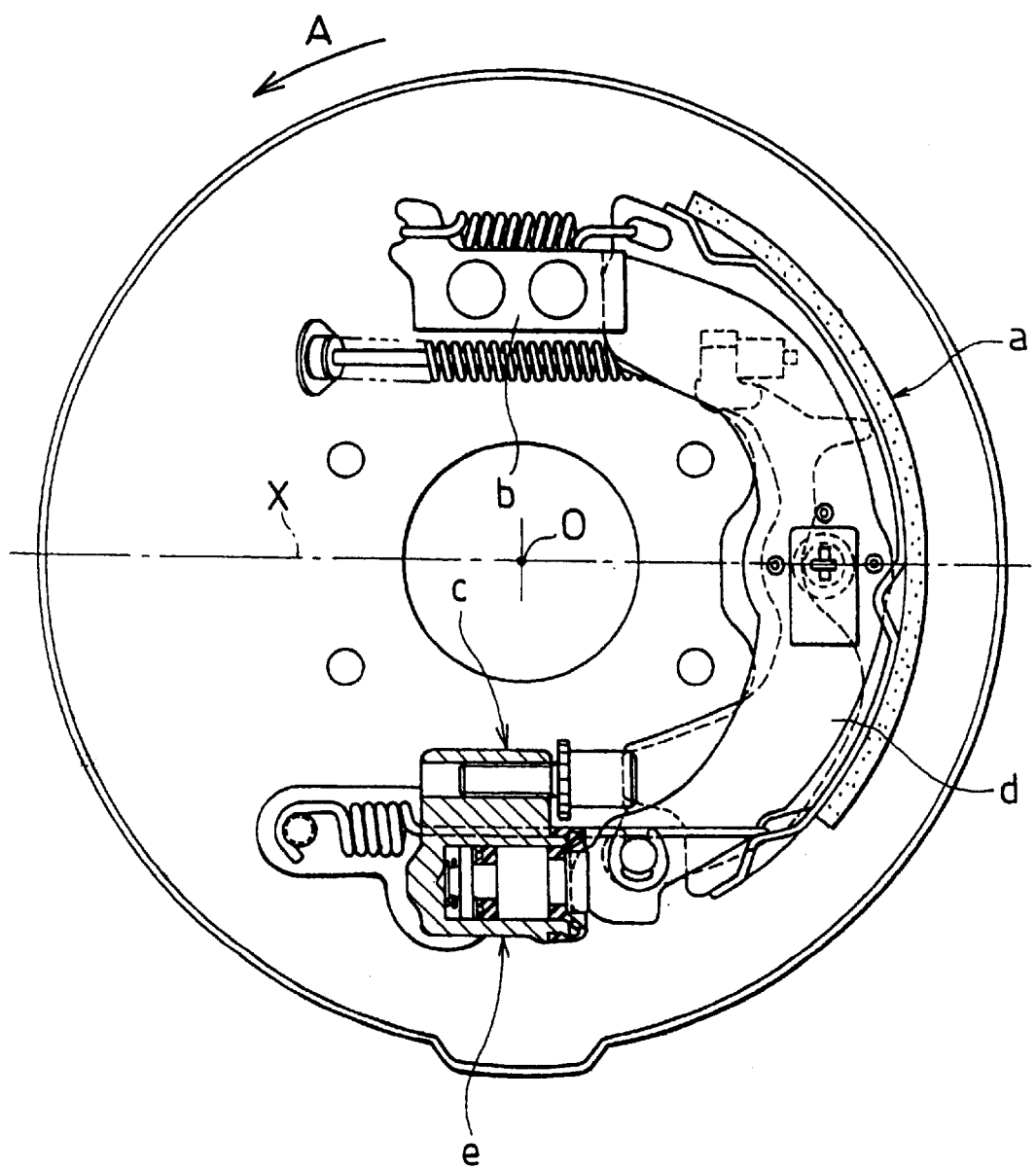
FIG. 12 is a plan view of the drum brake device on which this invention is based.

As shown in the enlarged diagram of FIG. 11, the shoe clearance adjustment device of this embodiment comprises the anchor block 210a fixed on the back plate 201 by bolts or the like, an adjustment bolt 215, having a male threaded part at one end to be screwed, and a sleeve 216 rotatably engaged with the other end of the adjustment bolt 215. A toothed adjustment wheel 215a is integrally provided at the center of the adjustment bolt 215.

In addition, the end surfaces of the shoe web 205 and the link 211 respectively slidably abut against the bottom flat surface of a notched groove 216c formed at the end of the sleeve 216.

A barrel-shaped hole 230b of the adjustment lever 230 is rotatably supported with a pin 231 placed adjacent to the lower end of the shoe web 205 as the fulcrum. A central segment 230c of the adjustment lever 230 abuts against and engages with the bottom surface of the notched groove 216c of the sleeve 216. A top end 230d of the adjustment lever 230 engages with the toothed adjustment wheel 215a of the adjustment bolt 215.

In addition, a first shoe return spring 217 of this embodiment extends between the adjustment lever 230 and a pin provided on the anchor block 210a. The return force of the first shoe return spring 217 is effected on the brake shoe 203 as well as the spring force in the clockwise direction at the pin 231 as the fulcrum is effected on the adjustment lever 230.

Further, an explanation of the structure of the service brake actuator, i.e., the wheel cylinder 212 and the parking brake actuator, i.e., the brake lever 220 and an explanation of the moment affecting the brake shoe 203 due to the first and second shoe return springs 217 and 218, are the same as in the first and second embodiments. Therefore, an explanation thereof is omitted here.

Also, the service brake operation and the parking brake operation are the same, and so an explanation thereof is omitted here.

When the service brake and/or parking brake are/is in operation, the anchor 210 side of the brake shoe 203 opens depending upon the moment difference between the first shoe return spring 217 and the second shoe return spring 218. At this time, the adjustment lever 230 rotates clockwise with the sleeve 216 as the fulcrum.

If the lining 206 wears out and the degree of rotation of the adjustment lever 230 exceeds the pitch of the toothed adjustment wheel 215a, the adjustment bolt 215 is automatically adjusted in an amount sufficient to keep a constant clearance between the brake drum and the lining 206.

The invention is by no means limited to the embodiments described above. For example, the position of the brake lever and the link relative to the shoe web may be reversed, or the force of the adjustment spring may be increased, which enables the shoe clearance to be automatically adjusted when the parking brake is activated. The possibility of many other variations should be evident to those people technically skilled in this industry.

The anchor member, supporting the end of the single brake shoe, which is closer to the brake center, is a pivot shoe anchor. The anchor member which is further from the brake center is a floating shoe anchor. This tends to equalize the braking effects when the vehicle is moving forward and backward, thereby avoiding the over-effect of the brake when moving forward and securing the effect when moving backward.

Only switching the type of the pair of anchor members needs to be done. This facilitates the design and the making of the layout.

This invention is effective not only in tending to equalize the braking effects when the vehicle is moving forward and backward, but also in preventing the damage possibly caused by such problems as flying gravel, debris, and the like by locating the wheel cylinder at the upper side of the brake device. This invention also facilitates the arrangement of the parking brake cable since it may be oriented to run and be pulled entirely toward the front of the vehicle.

A single brake shoe improves the feeling of the driver in the pedal and parking lever action because the pedal and parking lever stroke may be reduced to approximately half of the conventional leading-trailing type drum brake.

An open space may be kept at the position facing the brake shoe of the back plate, which facilitates the installation of other devices, such as a sensor for an anti-lock braking device.

This structure also prevents imposing an impact load by the shoe against the anchor member by continuously maintaining the abutment of the anchor member when in moving forward which is an overwhelmingly more frequent action and tends to be used in a high speed and in a high braking reduction.

Further, no impact noise, which is cause when the brake shoe collides the anchor member, is created. This prevents giving uncomfortable feeling to the driver.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A drum brake device comprising:
   a back plate;
   first and second anchor members mounted on said back plate;
   a single brake shoe movably mounted on said back plate, one end of said brake shoe functionally engaging said first anchor member by abutment against said first anchor member and the other end of said brake shoe functionally engaging said second anchor member by abutment against said second anchor member;
   a service brake actuator, which activates when a service brake is applied, mounted on said back plate;
   a supporting member mounted on said back plate;
   a link pivotably supported at a pivot point of a central region of said brake shoe, one end of said link functionally engaging said service bake actuator, while the other end of said link being supported by said supporting member, so that an operation force of the service brake actuator which acts on the link is transferred to said brake shoe through the pivot point of said link, wherein
   one of said first and second anchor members closer to a horizontal straight line through a center of the brake device and across said brake shoe functions as a pivot shoe anchor, while the other anchor member faraway from said horizontal straight line functions as a floating shoe anchor.

2. A drum brake as claimed in claim 1, wherein
   a shoe clearance adjustment means for adjusting a clearance between the brake drum and said brake shoe is provided at either the first or the second anchor member.

3. A drum brake device as claimed in claim 1, further comprising:
   shoe clearance adjustment means for automatically sensing the amount of opening by which said brake shoe opens and adjusts said clearance between said brake drum and said brake shoe.

4. A drum brake device as claimed in claim 2, wherein
   said shoe clearance adjustment means comprises means for automatically sensing the amount of opening by which said brake shoe opens and adjusts said clearance between said brake drum and said brake shoe.

5. A drum brake device as claimed in claim 1, further comprising:
   a parking brake actuator, which operates when a parking brake is activated, said parking brake actuator being connected for one side of said link to be opened.

6. A drum brake device as claimed in claim 2, further comprising:
   a parking brake actuator, which operates when a parking brake is activated, said parking brake actuator being connected for one side of said link to be opened.

7. A drum brake device as claimed in claim 3, further comprising:
   a parking brake actuator, which operates when a parking brake is activated, said parking brake actuator being connected for one side of said link to be opened.

8. A drum brake device as claimed in claim 1, further comprising:
   at least one shoe return spring extending between said brake shoe and a stationary point, wherein
   the moment of said at least one shoe return spring which pivots at the pivot point of said link engaging with said brake shoe is so set that the moment at the anchor side is to be larger than the moment at the other side when a vehicle is moving forward.

9. A drum brake device as claimed in claim 2, further comprising:
   at least one shoe return spring extending between said brake shoe and a stationary point, wherein
   the moment of said at least one shoe return spring which pivots at the pivot point of said link engaging with said brake shoe is so set that the moment at the anchor side is to be larger than the moment at the other side when a vehicle is moving forward.

10. A drum brake device as claimed in claim 3, further comprising:

at least one shoe return spring extending between said brake shoe and a stationary point, wherein the moment of said at least one shoe return spring which pivots at the pivot point of said link engaging with said brake shoe is so set that the moment at the anchor side is to be larger than the moment at the other side when a vehicle is moving forward.

11. A drum brake device as claimed in claim 1, wherein said supporting member supporting the other side of said link is shared with said anchor member supporting said brake shoe.

12. A drum brake device as claimed in claim 2, wherein said supporting member supporting the other side of said link is shared with said anchor member supporting said brake shoe.

13. A drum brake device as claimed in claim 3, wherein said supporting member supporting the other side of said link is shared with said anchor member supporting said brake shoe.

14. A drum brake device as claimed in claim 4, wherein said supporting member supporting the other side of said link is shared with said anchor member supporting said brake shoe.

15. A drum brake device as claimed in claim 5, wherein said supporting member supporting the other side of said link is shared with said anchor member supporting said brake shoe.

16. A drum brake device as claimed in claim 1, wherein said service brake actuator is a one-side-open-type wheel cylinder.

17. A drum brake device as claimed in claim 2, wherein said service brake actuator is a one-side-open-type wheel cylinder.

18. A drum brake device as claimed in claim 3, wherein said service brake actuator is a one-side-open-type wheel cylinder.

19. A drum brake device as claimed in claim 4, wherein said service brake actuator is a one-side-open-type wheel cylinder.

20. A drum brake device as claimed in claim 5, wherein said service brake actuator is a one-side-open-type wheel cylinder.

* * * * *